United States Patent
Geiger et al.

(10) Patent No.: US 6,526,638 B2
(45) Date of Patent: Mar. 4, 2003

(54) DEVICE FOR PRODUCING RELATIVE MOTION WITH TWO TRANSLATIONAL DEGREES OF FREEDOM

(75) Inventors: Michael Geiger, Starnberg (DE); Peter Meier, Goldach (CH); Thomas Treib, Lugano (CH)

(73) Assignee: Mikron SA Agno, Lugano (CH)

( * ) Notice: Subject to any disclaimer, the term of this patent is extended or adjusted under 35 U.S.C. 154(b) by 4 days.

(21) Appl. No.: 10/067,197

(22) Filed: Feb. 7, 2002

(65) Prior Publication Data

US 2002/0085893 A1 Jul. 4, 2002

Related U.S. Application Data

(63) Continuation of application No. 09/558,385, filed on Apr. 26, 2000, now Pat. No. 6,367,135.

(51) Int. Cl.[7] .............................. B23Q 5/34; B23C 1/12; B24B 17/00; B23B 9/10
(52) U.S. Cl. ........................ 29/27 C; 82/75; 409/201; 409/211; 409/216; 451/216
(58) Field of Search .............................. 29/27 C, 27 R, 29/26 A; 408/38; 409/162, 168, 199, 201, 200, 217, 211, 216, 221; 82/118, 75, 112, 114, 115; 83/604; 901/15, 19; 451/204, 216, 226

(56) References Cited

U.S. PATENT DOCUMENTS

| | | |
|---|---|---|
| 3,589,075 A | 6/1971 | Carlson |
| 4,094,102 A | 6/1978 | Lauze et al. |
| 4,215,958 A | 8/1980 | Jagers |
| 4,335,637 A | 6/1982 | Kaltenbach |
| 4,638,550 A | 1/1987 | Malzkorn |
| 4,945,792 A * | 8/1990 | Gardner ..................... 82/1.2 |
| 5,238,340 A | 8/1993 | Ochias et al. |
| 5,241,794 A | 9/1993 | Pedersen et al. |
| 5,329,457 A | 7/1994 | Hemmerle et al. |
| 5,349,731 A | 9/1994 | Sheehan et al. |
| 5,405,222 A | 4/1995 | Ward |
| 5,419,223 A * | 5/1995 | Kubler et al. ................. 82/118 |
| 5,482,415 A | 1/1996 | Belaga et al. |
| 5,551,814 A | 9/1996 | Hazama |
| 5,765,270 A | 6/1998 | Schrob et al. |
| 5,919,014 A | 7/1999 | Week et al. |
| 5,964,016 A | 10/1999 | Ito et al. |

FOREIGN PATENT DOCUMENTS

| | | | |
|---|---|---|---|
| DE | U1-29611587 | 10/1996 | |
| DE | A1-19507989 | 12/1996 | |
| DE | 10002013 | * 7/2001 | ................. 409/201 |
| EP | A2281754 | 9/1988 | |
| EP | A2542194 | 5/1993 | |
| EP | A1780181 | 6/1997 | |
| EP | A2791438 | 8/1997 | |
| EP | A1816012 | 7/1998 | |
| GB | 1285914 | 8/1972 | |
| JP | A61241055 | 10/1986 | |

* cited by examiner

*Primary Examiner*—William Briggs
(74) *Attorney, Agent, or Firm*—Birch, Stewart, Kolasch & Birch, LLP

(57) ABSTRACT

A device for producing relative motion with two translational degrees of freedom between a spindle means (95, 195, 295 395) with a spindle which bears the first part of a first pair of parts formed from a workpiece and a tool, and a retaining element for holding the second part of the first pair of parts, has a first base part to which a first part of a second pair of parts which is formed from the spindle means (95, 195, 295, 395) and the retaining element is attached. The movement device furthermore comprises a second base part, and at least one of the two base parts can be moved in a straight line with respect to the other along a linear guide with a first translational degree of freedom. A support for bearing the second part of the second pair of parts is coupled to the second base part to be able to swivel by means of a swivel joint around a swivel axis which is located at right angles to the linear guide such that the second part of the second pair of parts can be moved by actuating the swivel joint with a second translational degree of freedom on a circular path. The reaction forces and moments which are formed in the machining of the workpiece with the tool are accommodated by the swivel joint which is made stiff; this makes it possible to make the drive means for actuating the swivel joint lightweight. The movement device is relatively simple to produce, dynamic and moreover has a high ratio of useful working space to the required construction space.

9 Claims, 6 Drawing Sheets

DEVICE FOR PRODUCING RELATIVE MOTION WITH TWO TRANSLATIONAL DEGREES OF FREEDOM

This application is a continuation of Application No. 09/558,385, filed on Apr. 26, 2000, U.S. Pat. No. 6,367,135 the entire contents of which are hereby incorporated by reference.

TECHNICAL DOMAIN

The invention relates to a device for producing relative motion with two translational degrees of freedom between a spindle means and a retaining element.

PRIOR ART

A spindle means is defined below as any kind of machine tool means which comprises a work spindle for producing rotary motion between a tool and a workpiece in order to machine the workpiece with the tool by means of rotary motion. Without explanations otherwise the term spindle is always defined as the work or main spindle of a machine tool. The rotary motion can be executed either by the tool (for example, in a drill press) or by the workpiece (for example, in a lathe).

To move a spindle means translationally with two degrees of freedom in one plane, in machine tool building conventionally a movement device in the manner of a compound slide is used. In doing so, on a first slide which enables a first translational motion along the first linear axis there is a second slide along with a slide drive in order to enable a second translational movement of the spindle means along a second linear axis which is located conventionally at right angles to the first linear axis. In a movement device designed in the manner of a cross slide for a spindle means all the moments and reaction forces which occur in the machining of a workpiece are transferred both to the drive and guide means of the second slide and also to the drive and guide means of the first slide. This results in that the required machine components of the two linear axes which are built on top of one another must be made with stiff guides or bearings in the form of machine bodies which have been made durable in order to achieve the conventionally desired machining precision. One such movement device is thus necessarily bulky and heavy, the great weight of the masses to be moved limiting the dynamics which can be achieved with one such movement device.

To achieve greater dynamics of the movement devices of the machine tools, in recent years so-called parallel machine kinematics have been developed. In a machine tool which is built using the concept of parallel machine kinematics the drives for the different axes of motion are parallel, this in contrast to the aforementioned movement device in the manner of a compound slide which represents one example of a serial machine kinematics. A movement and positioning device based on parallel machine kinematics for a spindle means is for example shown in FIG. 17 of document EP-A2-0 791 438. A spindle means in the form of a quill with a main spindle which is adjustable in the z-direction is held stationary via eight connecting arms in a support frame. The eight connecting arms are coupled on one end to the rotary spindle unit and on the other end to one slide each. All eight slides can each be moved on a linear guide, the eight linear guides being arranged at right angles to the z-direction. By means of coordinated displacement of the slides the spindle means can be moved in the X-Y plane which is normal to the z-direction.

Based on the smaller moved masses, the movement device as in EP-A2 0 791 438 enables greater dynamics than the movement devices mentioned above in the manner of a compound slide. To produce a movement device as in EP-A2 0 791 438 however greater construction effort is necessary. A total of eight linear guides must be arranged precisely to one another and a total of sixteen hinges must be aligned parallel to one another; this is complex in terms of production engineering and is accordingly expensive. Moreover, the construction space which is necessary for the movement device is large relative to the useful working space. Furthermore there are as is typical for parallel machine kinematics certain unfavorable states of the movement device in which for a small motion in a desired direction excessively large compensation motions of individual slides are necessary. This is the case in the movement device as in EP-A2 0 791 438 for example when one connecting arm includes a flat angle with its assigned linear guide and the spindle means must be moved essentially perpendicularly to this linear guide.

DESCRIPTION OF THE INVENTION

The object of this invention is to devise a device for producing relative motion with two translational degrees of freedom between a spindle means and a retaining element. The movement device should be simple to produce and dynamic and moreover should have a high ratio of useful working space to the required construction space.

According to the invention a device for producing relative motion with two translational degrees of freedom between a spindle means with a spindle which bears the first part of a first pair of parts formed from a workpiece and a tool and a retaining element for holding the second part of the first pair of parts has a first base part to which a first part of a second pair of parts which is formed from the spindle means and the retaining element is attached. The movement device furthermore comprises a second base part, at least one of the two base parts can be moved in a straight line with respect to the other along a linear guide with a first translational degree of freedom. A support for carrying the second part of the second pair of parts is coupled to the second base part to be able to swivel by means of a swivel joint around a swivel axis which is located at right angles to the linear guide such that the second part of the second pair of parts can be moved by actuating the swivel joint with a second translational degree of freedom on a circular path.

The reaction forces and moments which are formed in the machining of the workpiece with the tool are accommodated by the swivel joint which is made stiff and massive. The stiff swivel joint enables articulated motion with exactly one rotational degree of freedom. It offers all other movements largely unyielding resistance based on its stiffness. This guarantees that essentially simply reaction forces are transmitted to a drive means for movement with the second translational degree of freedom (i.e. to a drive means for actuating the swivel joint) and act in the direction of this motion with the second translational degree of freedom. All other reaction forces and moments of the reaction forces and moments which are formed in the machining of the workpiece with the tool are accommodated by the stiff swivel joint. The drive means for the second translational degree of freedom must therefore be made stiff only in that direction in which they actuate the joint. Therefore the drive means for the second translational degree of freedom compared to the corresponding drive means can be made light in a movement device designed in the manner of a compound slide.

In the production of a movement device according to the invention essentially only a single swivel joint must be aligned with great precision at right angles to the linear guide. This means a great simplification of production compared to production of a movement device as claimed in EP-A20 791 438. Because the second part of the second pair of parts must be borne by the support from only one side, with a movement device according to the invention moreover a greater ratio of the useful working space to the required construction space can be achieved than with a movement device as in EP-A20 791 438.

The linear guide of the movement device of the invention can be located on a base structure. The base structure can consist of a housing of a machine tool, a support frame, an installation platform or another basic structure. It defines simply the reference base for the relative motion of the movement device of the invention. The linear guide can be located on the base structure horizontally, vertically or at any oblique angle. By the arrangement of the linear guide at such a oblique angle in the case of workpiece machining especially advantageous fall of chips can be achieved.

One movement device according to the invention is characterized preferably by drive means for actuating at least one base part which can move along the linear guide, which means comprise a drive spindle which is parallel to the linear guide and a nut which is attached to the moveable base part, the drive spindle and the nut being arranged and made such that they interact in the manner of a spindlenut drive (preferably of the ball circulating spindle type). But also other suitable drive means can be used for driving the moveable base part along the linear guide, for example drive means in the form of one or more linear motors.

In one preferred embodiment of the invention the support is located on the second base part such that it can be aligned essentially parallel to the linear guide, the direction of the support (or the support means) in the course of this description and claims always being defined as the projection of the direction from the swivel joint to the machining point of the second part of the second pair of parts onto the plane which is normal to the swivel axis, the projection being parallel to the swivel axis.

In one preferred version of the invention the support and the second base part are made such that the support can be swiveled around the swivel axis in an angular range of 90 degrees. In the other preferred version of the invention the support and the second base part are made such that this angular range is 60 degrees. For a given movement device a large angular range creates a correspondingly large useful working space. A by large angular range is thus advantageous with respect to the ratio of required construction space to useful working space of the movement device. On the other hand, for a large angular range there are often unfavorable states of the movement device in which for small movements in a certain direction unduly large compensation movements of individual drives are necessary. The best compromise between the useful working space and the small compensation movements depends on the respective application.

In one preferred version with a support which can be aligned parallel to the linear guide, the support and the second base part are made such that the support can be swivelled around a swivel axis in an angular range which is defined by a first angle which deviates by 40 degrees from the parallel direction to the linear guide to a first side and by a second angle of the support direction which deviates by −20 degrees from the parallel direction to the linear guide to the other side. In another preferred embodiment of the invention this angular range is defined by a support direction which deviates by 30 degrees to one side and by −30 degrees to the other side from the parallel direction to the linear guide. Conventionally the swivel motion of the support is limited to one side by a linear guide. In this case, for an asymmetrical angular range of given size the swivel axis (and thus the center of gravity of the movement device) can be nearer at the linear guide than in a symmetrical angular range of equal size. This is advantageous with respect to the stiffness of the movement device. Conversely, by means of a symmetrical angular range a more balanced motion sequence is enabled than in an asymmetrical angular range. Optimization of the angular range depends in turn on the respective application.

Actuating the movement device such that the support direction is always within this angular range guarantees that the movement device cannot assume unfavorable states in which for a small movement of the second part of the second pair of parts in a desired direction unduly large compensation movements by the drive means are necessary. According to another preferred version of the invention the angular range which can be assumed by the support with reference to a parallel to the linear guide is limited even to 45 degrees deviation to one side and to 15 degrees deviation to the other side of this parallel.

Preferably the second base part (to which the support is connected) can move in a straight line along the linear guide. The first base part can then be securely joined to the base structure and even made as an integral component of the base structure.

According to one preferred version of the invention the work spindle of the spindle means, which is held either by the retaining element on the first base part or is borne by the support on the second base part, is located parallel to the swivel axis of the swivel joint, by means of which the support is connected to the second base part. This arrangement has the advantage that it is irrelevant for workpiece machining whether the translational motion which is executed by the second part of the second pair of parts (on a circular path with the swivel axis as the center) with rotational motion (around the swivel axis) is coupled or not, since workpiece machining takes place rotationally symmetrically anyway with reference to the work spindle. The support of a corresponding movement device can then be made easily; it can be made as an essentially one-piece arm which is coupled to the second base part by means of only one single swivel joint. This embodiment of the invention can be advantageously used for a drilling spindle or for a quill.

According to another preferred version of the invention the work spindle of the spindle means, which is held either by the retaining element on the first base part or is borne by the support on the second base part, is arranged perpendicular to the swivel axis of the swivel joint, by means of which the support is coupled to the second base part. This version of the invention is especially suitable for the case of a vertically arranged linear guide of the movement device.

Preferably the support is made in the manner of a box in order to form a three-dimensional support structure with high stiffness. The support can be made for example essentially as a wedge-shaped box and can be coupled to the second base part in the area of the tip of the wedge. The second part of the second pair of parts is then borne by the support preferably in the area of the foot of the wedge opposite the tip of the wedge.

To actuate the swivel joint an elongated drive lever can be attached on one of its longitudinal ends securely to a support. The drive lever can be attached to the support such that it includes an angle with the latter in the area of the swivel axis. Preferably the support and the drive lever are made essentially as a one-piece rocker, the support forming a first arm of the rocker and the drive lever forming a second arm of the rocker and the rocker being coupled to the second base part of the movement device such that it can be swiveled around the swivel axis in the area of the connecting angle between the two arms.

According to one preferred embodiment of the invention, the movement device has drive means for actuating the swivel joint which comprise a drive spindle (hereinafter also called the articulated drive spindle). Preferably the articulated drive spindle is supported to be able to turn around its axis in bearings which are attached to the second base part in order to drive a nut in the manner of a spindle-nut drive. In the case of a support which is made in the manner of a rocker with one drive lever the nut can be hinged to the drive lever via a deflection mechanism in order to drive the drive lever and thus the support which is securely joined to the drive lever to swivel motion around the swivel axis. Preferably the articulated drive spindle is located parallel to the linear guide for the movable base part. In this case the nut driven by the articulated drive spindle can be guided by a guide which is parallel to the linear guide for the movable base part, and for guidance of the nut driven by the articulated drive spindle either a separate guide or the linear guide of the base part itself can be used.

If in the version of the invention with a movable second base part (on which the support is coupled) the articulated drive spindle is supported on the second base part, the movement device represents serial machine kinematics; the drive means for joint actuation (i.e. for the second translational degree of freedom) are entrained on the base part which can be moved with the first translational degree of freedom. In this arrangement the drives of the two translational degrees of freedom are decoupled from one another: the first translational degree of freedom of the movement device is assigned to the drive means for moving the second base part along the linear guide and the second translational degree of freedom of the movement device is assigned to the joint actuation means.

As an alternative to the serial arrangement of the drives for the two translational degrees of freedom, parallel machine kinematics can also be implemented by supporting the articulated drive spindle to be able to turn around its axis in bearings which, like for example also the linear guide for the first translational degree of freedom, are attached to the base structure. But in this arrangement the drive of the second translational degree of freedom is dependent on the drive of the first translational degree of freedom; if the second base part is moved along the linear guide without simultaneous activation of the articulated drive spindle, at the same time the swivel joint is also actuated and the movement device is moved with the second translational degree of freedom. In the parallel kinematic version of the invention, both for the articulated drive and also for the drive of the movable base part along the linear guide, instead of spindles advantageously a linear drive can be used since they enable much higher advance speeds compared to spindles.

To actuate the swivel joint (i.e., to move the support with reference to the second base part around the swivel axis), instead of the above described joint actuation means also other suitable drive means can be used for driving a swivel joint. Thus the joint actuation means can for example comprise a directly driven round axle. As an alternative the joint actuation means can also comprise any other suitable linear drive which acts between the support and the second base part. For example, this linear drive can consist of a hydraulic lifting device which comprises a piston and a cylinder. As another version the support can be actuated by an articulated drive spindle which is coupled to a second base part around a swivel axis which is parallel to the swivel axis of the support; the drive spindle drives a nut coupled to the support in the manner of a spindle-nut drive.

According to another preferred version of the invention, by means of a second swivel joint a guide arm is coupled to the second base part to be able to swivel around a swivel axis which is parallel to the swivel axis of the support; the guide arm being connected to the support on its longitudinal end facing away from the second base part via a connecting rod which is coupled to the guide arm and also the support such that together with the support it forms a parallelogram connecting rod with a connecting rod which bears the second part of the second pair of parts on a circular path in a translationally movable manner. The embodiment of the invention is advantageous especially when the work spindle of the spindle means is not located parallel to the swivel axis of the swivel joint. Since in this case generally for workpiece machining the rotary position of the second part of the second pair of parts borne on the support with respect to the swivel axis must be considered, decoupling of the motion with the two translational degrees of freedom from the rotary motion of the second part around the swivel axis is desirable. This decoupling is achieved by the parallelogram connecting rod. A movement device according to this preferred embodiment of the invention can be used for example advantageously for machining of a workpiece by means of a vertical work spindle, the vertical work spindle being located essentially parallel to the linear guide means for the first degree of freedom of the movement device.

Another preferred version of the invention is characterized in that the movement device comprises another base part to which by means of another swivel joint another support for bearing another spindle means is coupled to be able to swivel around another swivel axis which is located at right angles to the linear guide such that the other spindle means can be moved by actuation of the other swivel joint translationally on a circular path. In this way a movement device can be formed which is suited for a machine tool built using the twin-spindle concept.

The following detailed description of this invention is used in conjunction with the attached drawings only as an example for better understanding of the invention and should not be interpreted as a limitation of the scope of protection of the patent claims. For one skilled in the art, from the following description in conjunction with the attached drawings and the totality of claims other advantageous embodiments and combinations of features can be easily recognized which however still lie within the domain of this invention. Thus it goes without saying for example for one skilled in the art in the area of machine tool building that the two translational degrees of freedom of the relative motion between a tool and a workpiece can be distributed in any way on the workpiece and the tool.

BRIEF DESCRIPTION OF THE DRAWINGS

The drawings used to explain the embodiments show the following:

FIGS. 1 and 2 show a first preferred embodiment of a movement device in accordance with the invention in a simplified, partially cut-away view from forward. FIG. 3 shows this movement device in a side view.

Basically the same parts are provided with the same reference numbers in the figures.

EMBODIMENTS OF THE INVENTION

Figure 1:
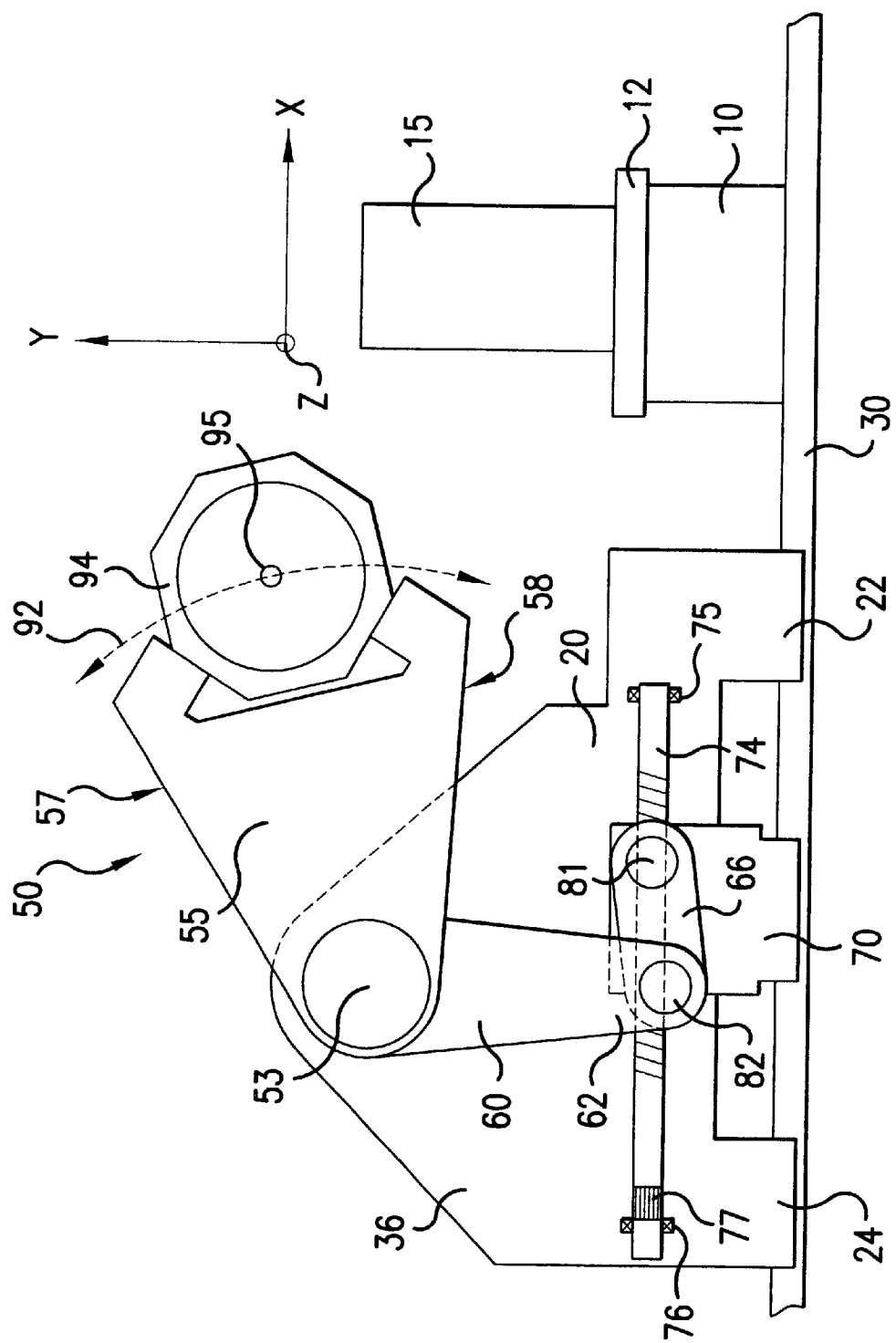
FIG. 1 shows a partially cut-away front view of a first preferred embodiment of a movement device according to the invention.
Figure 2:
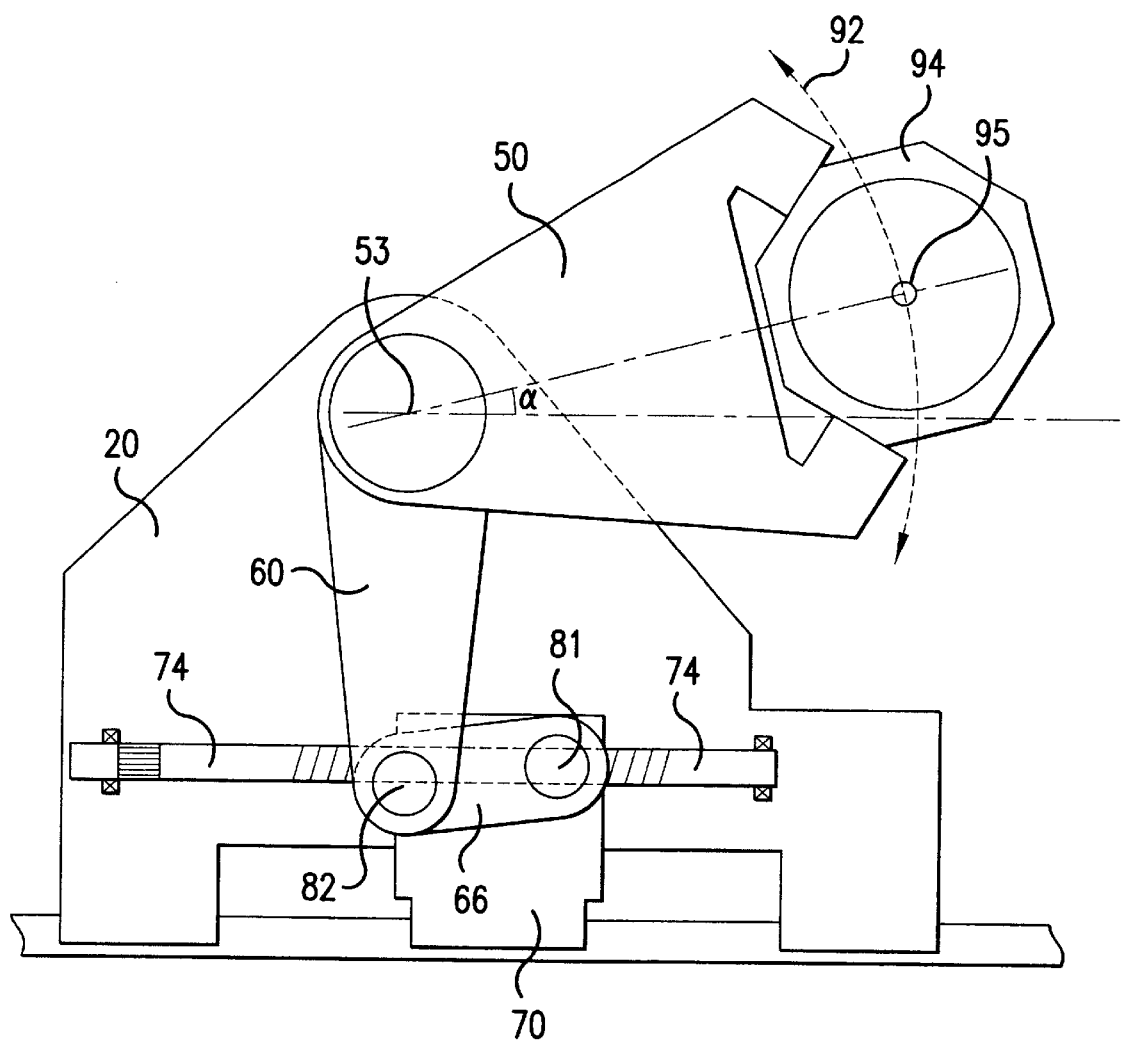
FIG. 2 shows the movement device from FIG. 1 in an enlarged partial view.
Figure 3:
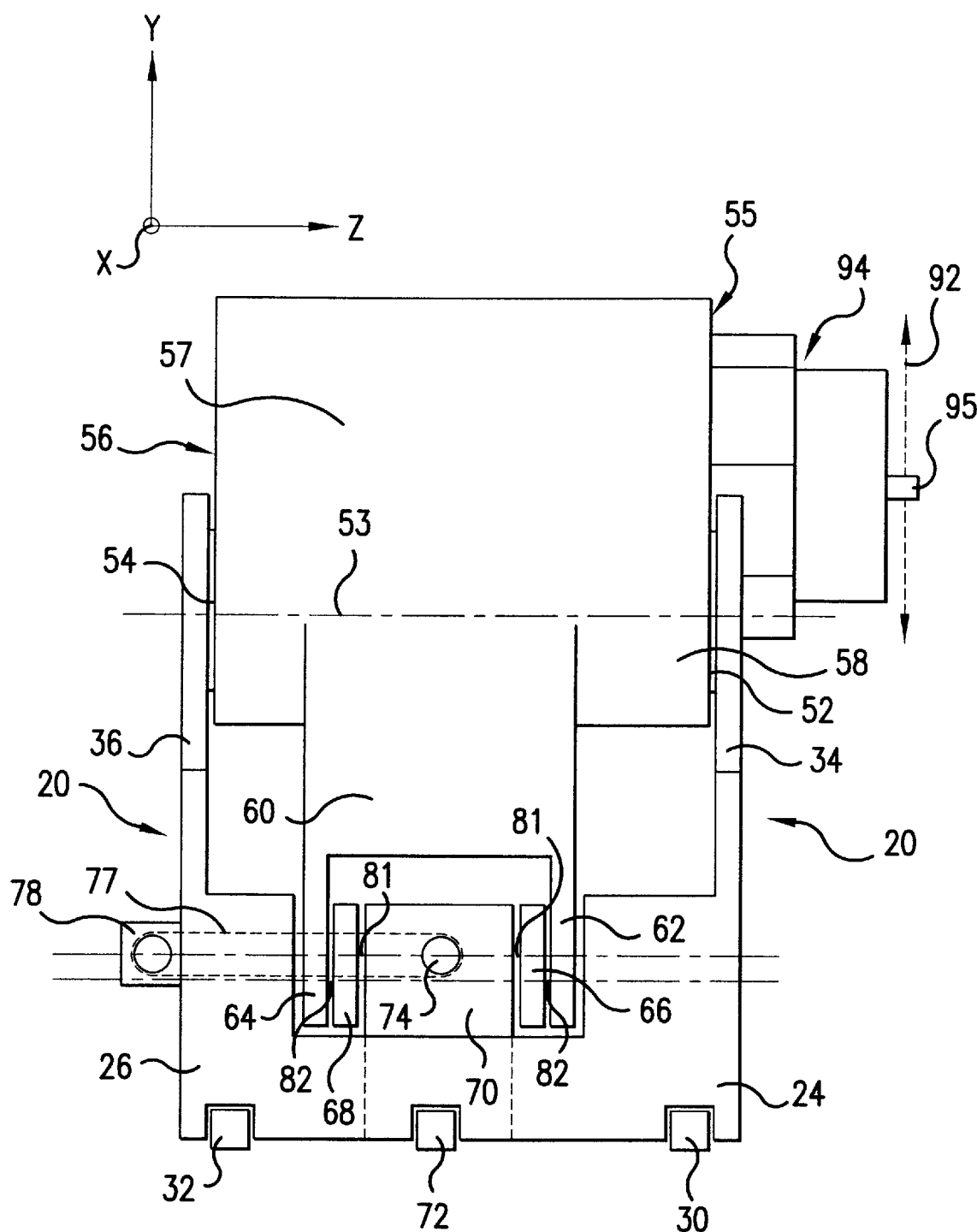
FIG. 3 shows the movement device from FIG. 1 in a side view.

FIGS. 1 and 2 shows a first preferred embodiment of a movement device as claimed in the invention in a simplified, partially cut-away view from forward. FIG. 3 shows this movement device in a side view.

The entire movement device is located on a massive base structure or a machine bed (not shown) which is built in the manner known for machine tools. On the machine bed there is a first base part 10 in the form of a base which is securely joined stationary to the machine bed. The first base part 10 can be made as an integral component of the machine bed. A retaining element 12 in the form of a workpiece platform is attached to the first base part 10 and the platform holds the workpiece 15 to be machined by means of a workpiece holder (not shown).

Furthermore, a linear guide in the form of two parallel guide rails 30, 32 which are conventional for machine tools is attached to the machine bed. These straight guide rails 30, 32 are arranged running past laterally next to the base 10 and define the X-direction of the movement device.

On the two guide rails 30, 32 there is a second base part 20 of the movement device in the form of a frame which can move along the guide rails 30, 32 with exactly one translational degree of freedom. For purposes of a displacement capacity in the x-direction the frame (second base 20) is provided with four traversing elements or slides 22, 24, 26 which interact with the two rails 30, 32 in order to guide the frame (second base 20) movably in the x-direction, the two traversing elements 22, 24 being located on the one guide rail 30 and the two traversing elements 26 being located on the other guide rail 32. The linear displacement capacity of the frame (second base 20) along the guide rails 30, 32 implements the first translational degree of freedom of the movement device which is shown in FIGS. 1 to 3.

The movement device furthermore comprises a drive device in order to drive the frame (second base 20) in the x-direction along the guide rails 30, 32. For the sake of clarity the drive device for the first translational degree of freedom is not shown in the drawings. The drive device for the first degree of freedom comprises a drive spindle (also called a feed rod or leadscrew) which is supported in bearings which are securely attached on the machine bed and which are located parallel to the guide rails 30, 32 and the drive spindle interacts with a nut attached to the frame (second base 20) in the manner of a spindle-nut drive (preferably of a ball circulating spindle type). But also other suitable drive means can be used for driving the frame (second base 20) in the x-direction, for example drive means in the form of one or more linear motors.

Figure 4:
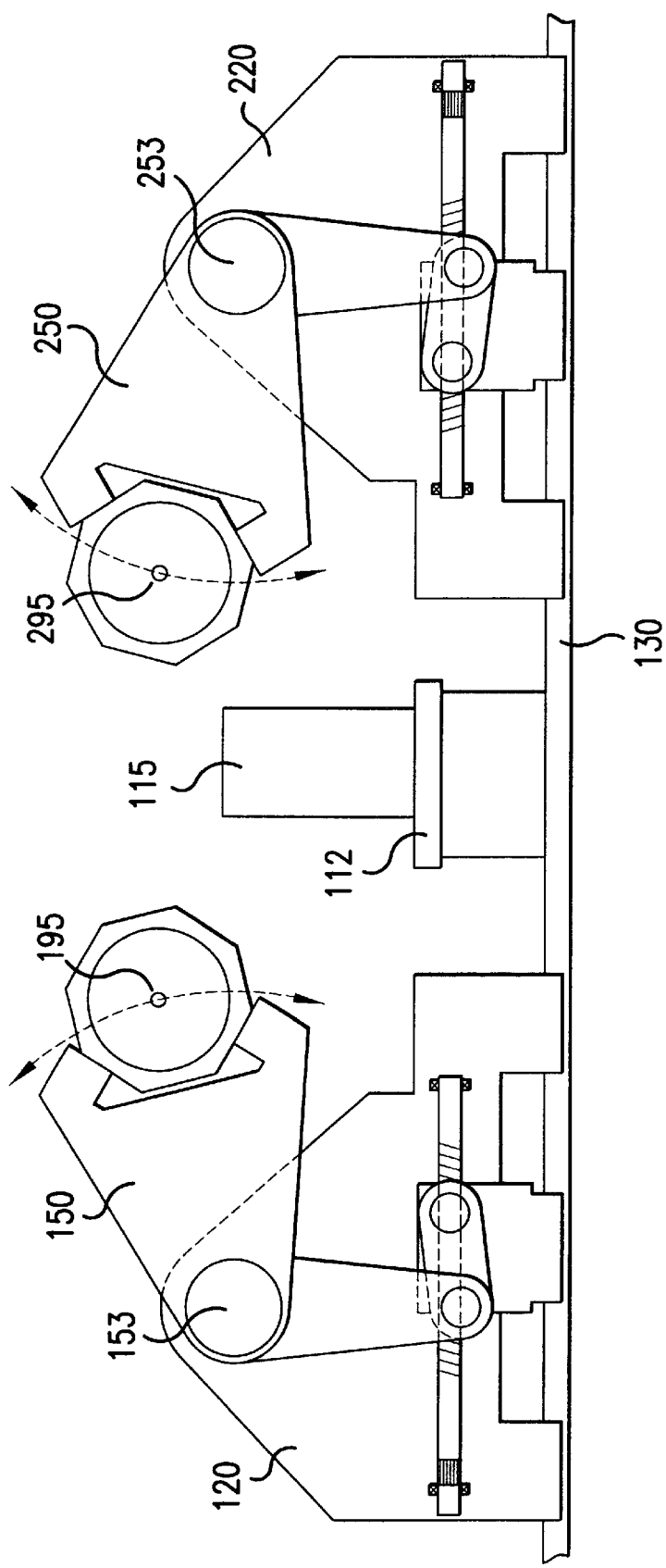
FIG. 4 shows a partially cut-away front view of another preferred embodiment of a movement device according to the invention.

In FIGS. 1, 3 and 4 furthermore for the sake of clarity the front part of the frame (second base 20) is partially cut-away (especially the front support wall 34 of the two support walls 34, 36 described below) in order to make visible the parts of the movement device which are hidden behind in reality. Furthermore, to improve clarity in these figures the frame (second base 20) is shown in a position which is shifted by the workpiece platform. It goes without saying that to machine the workpiece 15 the frame (second base 20) is positioned on the guide rails 30, 32 such that the workpiece 15 is located in the extension of the quill axis.

The frame (second base 20) is made as a lightweight construction and consists of several ribbed metal sheets which are welded together into a stiff, three-dimensional support structure. It goes without saying that in the other embodiments of the invention shown in the Figures the frame (second base 20) can be made in the manner known for machine tool construction also from cast iron, ceramic, CFK (carbon fiber reinforced plastics) or other suitable materials. The frame (second base 20) comprises two support walls 34, 36 which are located essentially parallel to the guide rails 30, 32 and which are provided with holes which are flush with one another and which are located at right angles to the guide rails 30, 32. There is one bearing in each of the two holes in order to accommodate the axle journals 52, 54 of the support 50 which is described below.

The support (arm 50) of the movement device shown in FIGS. 1 to 3 together with its drive arm 60 essentially has the form of a rocker with a very stiffly made connecting lever. One arm 50 of the rocker is used as a support for bearing a spindle means which in the embodiments of the invention shown in the Figures consists of a quill 95, while the other rocker arm 60 is used as a connecting lever for driving the rocker. At the connection site of the two arms 50, 60 which are arranged angularly two axle journals 52, 54 are molded on the rocker and they define an axis 53 which is perpendicular to the angle plane. The two axle journals 52, 54 are supported in the aforementioned bearings in the support walls 34, 36 of the frame (second base 20). By this arrangement the rocker is coupled to the frame (second base 20) to be able to swivel around the swivel axis 53 which is defined by the axle journals 52, 54 by means of the swivel joint which is formed by the bearings and the axle journals 52, 54, the swivel axis 53 being located at right angles to the two guide rails 30, 32 of the linear guide in the x-direction. The direction of the swivel axis 53 is defined as the Z-direction and the direction at a right angle to the X-direction and to the z-direction is defined as the Y-direction of the movement device.

The arm 50 of the rocker which is made as a quill support is made box-shaped in order to impart to it a stiffness as great as possible. It is composed in turn as a lightweight construction of several ribbed sheets in order to form a solid, three-dimensional support structure with high stiffness. Of course in other embodiments of the invention which are not shown in the figures the rocker which comprises the quill support and the connecting lever can be made in the manner known for machine tool construction from cast iron, ceramic, CFK (carbon fiber reinforced plastics) or other suitable materials.

The box-shaped support (arm 50) has essentially the form of a wedge with two parallel trapezoidal walls 55, 56 and two essentially rectangular walls 57, 58 which connect the trapezoidal walls and which form the wedge surfaces 57, 58. In the wedge tip which is made as a rounded section the aforementioned axle journals 52, 54 are molded onto the two trapezoidal walls 55,56. On the foot of the wedge of the support (arm 50) opposite the tip of the wedge, by means of a drive and guide means (not shown) the quill 95 together with the sleeve spindle drive and a corresponding quill housing 94 are arranged to be able to move in the Z-direction, the quill being aligned parallel to the swivel axis 53 (i.e., in the Z-direction). The double arrow 92 which is shown in the drawings 1 to 3 in broken lines represents motion with the second translational degree of freedom which is executed by the quill 95 around the swivel axis 53 when the swivel joint is actuated.

As is generally known in machine tool construction, individual axes of relative motion between a tool and a workpiece can be shifted either to the tool or to the workpiece. Thus, in a version of a movement device which is not shown in the figures the translational movement in the z-direction is executed by the workpiece platform's being able to move along another linear guide in the z-direction. In this movement device the quill is attached securely, i.e. stationary in the z-direction, to the swiveling quill carrier.

The drive arm 60 is used to actuate the rocker and thus the support (arm 50) around the swivel axis 53. To actuate the rocker the movement device has an articulated drive spindle 74 which is supported to be able to rotate around its axis parallel to the two guide rails 30, 32 and roughly in the center above these guide rails 30, 32 in bearings 75, 76 which are attached to the frame (second base 20). The articulated drive spindle 74 is located in an intermediate space between the two support walls 34, 36 of the frame (second base 20). Between the two guide rails 30, 32 and parallel to them another straight guide rail 72 is attached to the machine bed which is used to guide the articulated drive traversing element in the x-direction. This other guide rail 72 is located roughly in the middle between the two guide rails 30, 32 underneath the articulated drive spindle 74.

The articulated drive spindle is driven to rotate around its axis via toothed belts 77 by a motor 78 which is flanged to the frame (second base 20). The articulated drive spindle 74 interacts with a nut on an articulated drive traversing element 70 in the manner of a spindle-nut drive (preferably of the ball circulating spindle type), the nut 70 and the articulated drive traversing element 70 being made as a one-piece integral part 70. The articulated drive traversing element 70 is arranged to be able to move in the X-direction in a shaft within frame (second base 20) which runs parallel to the articulated drive spindle 74 and which is open towards the machine bed, its being guided in the X-direction by the other guide rail 72.

The longitudinal end of the drive arm 60 facing away from the swivel axis 53 is made fork-shaped and has two leg-like extensions 62, 64 with a U-shaped passage located in between. These two lateral extensions 62, 64 of the drive arm 60 are each hinged to the articulated drive traversing element 70 via an elongated deflection arm 66, 68. The first deflection arm 66 is coupled to be able to swivel around a first hinge 81 to a first side wall of the articulated drive traversing element 70 parallel to the articulated drive spindle 74 and to be able to swivel around a second hinge 82 to one 62 of the two leg-shaped extensions 62, 64 of the drive arm 60. The second deflection arm 68 is coupled to be able to swivel around the first hinge 81 to a side wall of the articulated drive traversing element 70 parallel to the first side wall and to be able to swivel around a second hinge 82 to the other 64 of the two leg-shaped extensions 62, 64 of the drive arm 60. Linear drive motion of the articulated drive traversing element 70 is deflected into circular motion of the drive arm 60 and thus also of the support 50 by the deflection mechanism which comprises the two hinges 81, 82 and the two deflection arms 66, 68.

In the position of the movement device which is shown in FIGS. 1 and 2 the U-shaped passage of the movement arm 60 fits over the deflection levers 66, 68, the articulated drive traversing element 70 and the articulated drive spindle 74. The U-shape of the longitudinal end of the drive arm 60 which faces away from the swivel axis 53 makes it possible to avoid unfavorable (stretched) angular positions between the drive arm 60 and the deflection levers 66, 68. This is advantageous with respect to highly dynamic activation of the movement device which is shown in the figures because then a balanced force distribution results.

In the embodiment of the invention shown in FIGS. 1 to 3 the support (arm 50) and the frame (second base 20) are made such that the support (arm 50) can be swiveled around the swivel axis 53 in an angular range of roughly 60 degrees, the support angle a with respect to the X-direction in the position of the quill 95 which is furthest from the linear guide being roughly 45 degrees and in the position nearest the linear guide roughly 15 degrees.

FIG. 4 shows another preferred embodiment of a movement device according to the invention in a simplified, partially cut-away view from forward. The movement device shown in FIG. 4 comprises a movement device which is identical to the one in FIGS. 1 to 3 with a retaining element 112 which holds the workpiece 115 to be machined, a frame 120 which can be moved in the X-direction on the guide rails 130, 132 (not shown) and to which by means of a swivel joint a support 150 for bearing a quill 195 is connected with the capacity to swivel around a swivel axis 153 which is located at right angles to the guide rails 130, 132 such that the quill 195 can be moved translationally on a circular path by actuating the swivel joint. In addition, the movement device shown in FIG. 4 comprises another frame 220 which is movably arranged on the guide rails 130,132 and to which by means of another swivel joint another support 250 for bearing another quill 295 is connected with the capacity to swivel around another swivel axis 253 which is located at right angles to the guide rails 130, 132 such that the other quill 295 can be moved translationally on a circular path by actuating the other swivel joint. The other frame 220 and the components attached thereto are arranged in mirror image to the first frame 120 and the components attached thereto.

Figure 5:
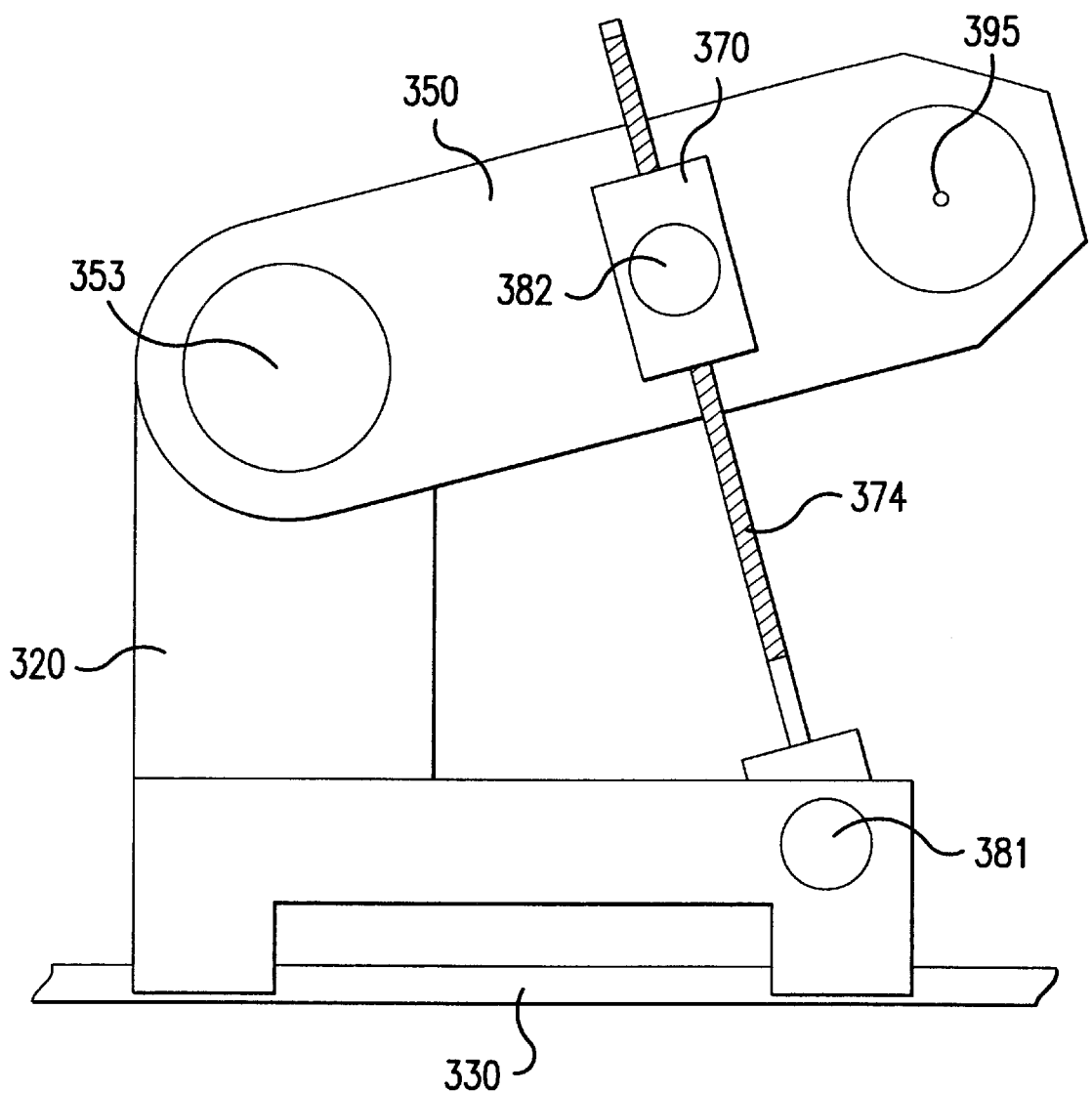
FIG. 5 shows a simplified partial view of a movement device according to another preferred embodiment of the invention.
Figure 6:
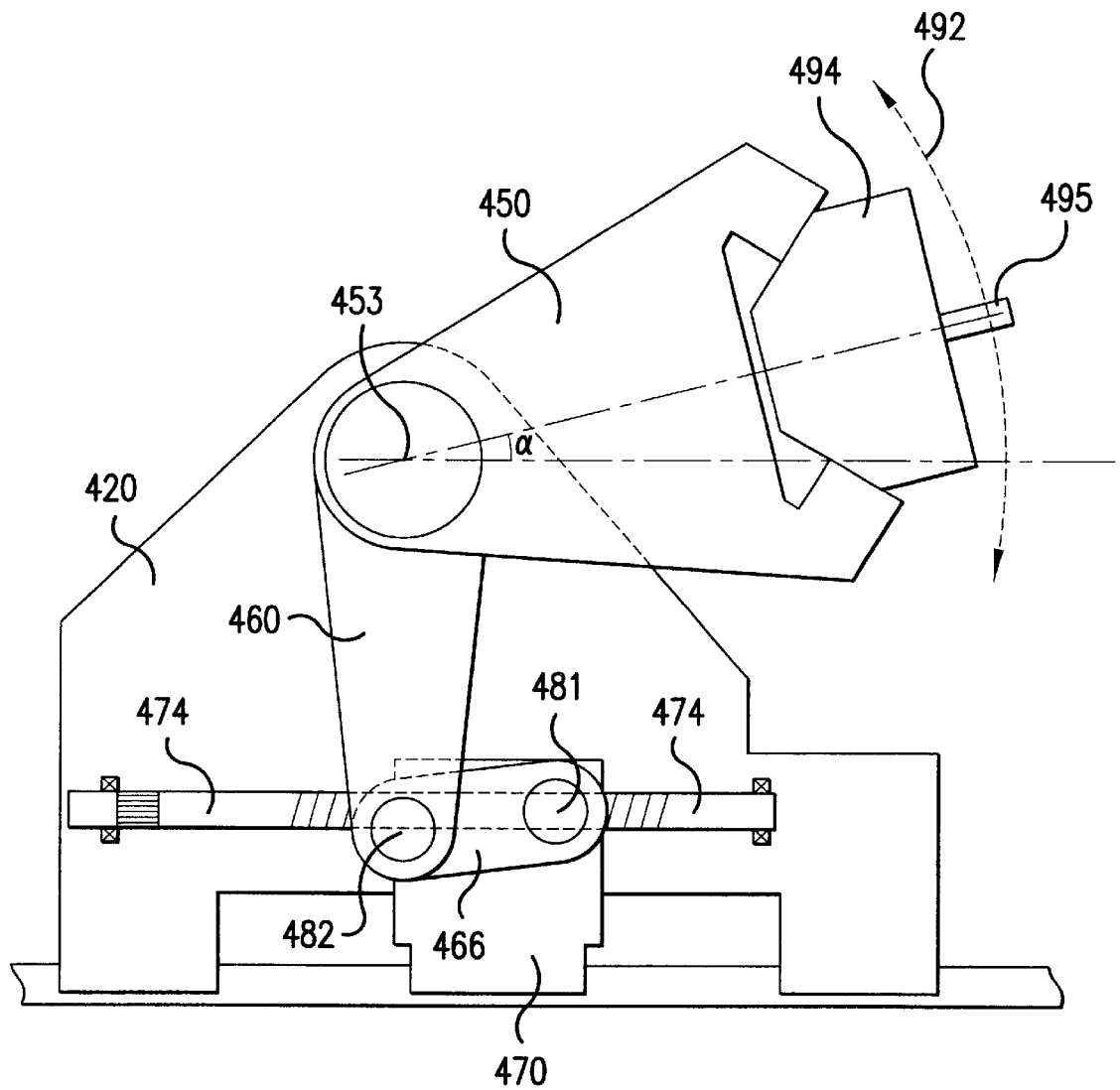
FIG. 6 shows another preferred embodiment of a movement device in a simplified partially cutaway view from forward.

FIG. 5 shows in a partial view which corresponds to FIG. 2 a movement device according to another embodiment of the invention. The movement device shown in FIG. 5 comprises a frame 320 which is located movable on linear guide rails 330 with one translational degree of freedom. An elongated support arm 350 on one of its longitudinal ends is connected to the frame 320 to be able to swivel around a swivel axis 353 which is at right angles to the direction of the guide rails 330, the swivel joint which joins the support arm 350 to the frame 320 being made in turn stiff and massive. On the other longitudinal end the support arm 350 bears a quill 395 which is parallel to the swivel axis 353. To actuate the support arm 350 a drive spindle 374 is attached to the frame base by means of a first hinge 381 to be able to swivel around the swivel joint 353; the axis of the hinge is parallel to the swivel axis 353 of the support arm 350. The drive spindle 374 is provided with suitable spindle drive means in order to move a nut 370 in the manner of a spindle-nut drive translationally along the spindle axis 374. By means of a second hinge 382 with an axis which is parallel to the swivel axis 353 of the support arm 350 the nut 370 is attached to the support arm 350 with a swivelling capacity in order to move the arm on a circular path around the swivel axis 353.

In summary it can be stated that the invention devises a device for producing relative motion with two translational degrees of freedom between a spindle means and a retaining element which is comparatively easy to manufacture and at the same time has a high ratio of usable working space to required construction space.

What is claimed is:

1. Device for producing a relative motion with two translational degrees of freedom between a spindle means and a retaining element, said spindle means having a spindle which bears a tool and is attached to a second base part, said retaining element for holding a workpiece and is attached to a first base part, at least one of the two base parts is movable in a straight line with respect to the other along a linear guide with a first translational degree of freedom; and a support for bearing the spindle means, said support is coupled to the second base part to be able to swivel by means of a swivel joint around a swivel axis which is located at right angles to the linear guide, such that the spindle means can be moved by actuating the swivel joint with a second translational degree of freedom on a circular path, wherein the support is made in the manner of a box in order to form a three-dimensional support structure with high stiffness.

2. Device as claimed in claim 1, further comprising drive means for actuating the swivel joint, said drive means comprising a drive spindle.

3. Device as claimed in claim 2, wherein said drive spindle for actuating the swivel joint is arranged parallel to the linear guide.

4. Device as claimed in claim 1, wherein said spindle means comprises a spindle being aligned parallel to the swivel axis and being arranged on the support such that it can be moved parallel to the swivel axis by means of appropriate drive and guide means.

5. Device as claimed in claim 4, wherein said spindle is a quill spindle.

6. Device for producing a relative motion with two translational degrees of freedom between a spindle means and a retaining element, said spindle means having a spindle which bears a workpiece and is attached to a second base part, said retaining element for holding a tool and is attached to a first base part, at least one of the two base parts is movable in a straight line with respect to the other along a linear guide with a first translational degree of freedom; and a support for bearing the spindle means, said support is coupled to the second base part to be able to swivel by means of a swivel joint around a swivel axis which is located at right angles to the linear guide, such that the spindle means can be moved by actuating the swivel joint with a second translational degree of freedom on a circular path, wherein the support is made in the manner of a box in order to form a three-dimensional support structure with high stiffness.

7. Device as claimed in claim 6, further comprising drive means for actuating the swivel joint, said drive means comprising a drive spindle.

8. Device as claimed in claim 7, wherein said drive spindle for actuating the swivel joint is arranged parallel to the linear guide.

9. Device as claimed in claim 6, wherein said spindle means comprises a spindle being aligned parallel to the swivel axis and being arranged on the support such that it can be moved parallel to the swivel axis by means of appropriate drive and guide means.

* * * * *